United States Patent
Kondabathini et al.

(10) Patent No.: US 10,365,676 B2
(45) Date of Patent: Jul. 30, 2019

(54) SECURED CONTROL OF CIRCUIT BREAKERS IN A DIGITAL SUBSTATION

(71) Applicant: ABB Inc., Cary, NC (US)

(72) Inventors: Anil Kondabathini, Apex, NC (US); Reynaldo Nuqui, Cary, NC (US); Zhenyuan Wang, Morrisville, NC (US); Dmitry Ishchenko, Cary, NC (US)

(73) Assignee: ABB Inc., Carey, NC (US)

( * ) Notice: Subject to any disclaimer, the term of this patent is extended or adjusted under 35 U.S.C. 154(b) by 528 days.

(21) Appl. No.: 14/700,918

(22) Filed: Apr. 30, 2015

(65) Prior Publication Data
US 2016/0320785 A1    Nov. 3, 2016

(51) Int. Cl.
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |

(Continued)

(52) U.S. Cl.
CPC .............. G05F 1/66 (2013.01); G05F 1/625 (2013.01)

(58) Field of Classification Search
CPC .... H01H 33/027; H01H 33/59; H01H 47/002; H02H 1/0007; H02H 3/021; H02H 3/066; H02H 3/08; H02H 3/16; H02H 3/28
See application file for complete search history.

(56) References Cited

U.S. PATENT DOCUMENTS

| 4,767,947 A | 8/1988 | Shah et al. |
| 7,343,360 B1 | 3/2008 | Ristanovic et al. |

(Continued)

FOREIGN PATENT DOCUMENTS

WO    2006043871    4/2006

OTHER PUBLICATIONS

International Search Report and Written Opinion, PCT/US2016/29778, ISA/US, ABB Inc., dated Jul. 27, 2016, 9 pgs.

(Continued)

*Primary Examiner* — Thomas C Lee
*Assistant Examiner* — Zhipeng Wang
(74) *Attorney, Agent, or Firm* — Taft Stettinius & Hollister LLP; J. Bruce Schelkopf

(57) ABSTRACT

Methods and systems for secured control of circuit breakers in an electric power substation against undesired direct operation. Consequences of a malicious action are prevented or mitigated using a validation approach that either blocks the command or ensures a negligible effect on system operation. An example method, suitable for implementation in a monitoring device in an electric power substation, includes receiving a command to open or close a circuit breaker. In response, one or more state parameters for the electric power network that comprises the substation are then predicted, the predicted state parameters reflecting an operating state for the network under the assumption that the received command is executed. The method further comprises comparing the predicted one or more state parameters to corresponding operational limits. Execution of the command is then blocked, in response to determining that one or more of the predicted state parameters violate the corresponding operational limits.

14 Claims, 9 Drawing Sheets

(51) Int. Cl.
*G05F 1/66* (2006.01)
*G05F 1/625* (2006.01)

(56) References Cited

U.S. PATENT DOCUMENTS

| | | |
|---|---|---|
| 7,620,517 B2 | 11/2009 | Scholtz et al. |
| 8,756,047 B2 | 6/2014 | Patel |
| 2005/0116814 A1 | 6/2005 | Rodgers et al. |
| 2005/0195538 A1* | 9/2005 | Khoroshev ............ H02H 3/066 361/42 |
| 2005/0280966 A1* | 12/2005 | Whitehead ................ H02J 3/42 361/81 |
| 2007/0088518 A1* | 4/2007 | Braun ................ G05B 19/0426 702/108 |
| 2008/0197715 A1* | 8/2008 | Karlsson ................ H02H 3/066 307/125 |
| 2009/0278653 A1* | 11/2009 | Jachmann ............ G05B 19/042 340/5.2 |
| 2012/0033713 A1 | 2/2012 | Yang et al. |
| 2013/0274941 A1* | 10/2013 | Khozikov ........... H04L 63/1416 700/292 |
| 2014/0277801 A1* | 9/2014 | Cioraca ................ H04W 12/06 700/292 |
| 2016/0301199 A1* | 10/2016 | Mori ....................... H01H 33/59 |
| 2017/0163029 A1 | 6/2017 | Hong et al. |
| 2017/0256985 A1* | 9/2017 | Chen ...................... G05B 15/02 |

OTHER PUBLICATIONS

Liu, Chen-Ching et al., "Intruders in the Grid", IEEE Power Energy Magazine, vol. 10, No. 1, Feb. 2012, 58-66.
Unknown, Author, "Bay control REC670 ANSI", ABB, Application Manual, 2010, 1-574.
Hazarika, "Line outage contingency analysis including the System Islanding Scenario" 2004, National Power Systems Conference, pp. 322-327.
"Power Flow Analysis" 2012, pp. 1-64.
Power World, "Power Flow Analysis and Voltage Control Using Simulator", 2008, pp. 1-68.

* cited by examiner

US 10,365,676 B2

SECURED CONTROL OF CIRCUIT BREAKERS IN A DIGITAL SUBSTATION

STATEMENT REGARDING FEDERALLY SPONSORED RESEARCH OR DEVELOPMENT

This invention was made with U.S. Government support under Cooperative Agreement No. DE-OE0000674 awarded by the US Department of Energy (DOE). The Government has certain rights in this invention.

TECHNICAL FIELD

The present disclosure is related to electric power systems and is more particularly related to controlling circuit breakers in electric power substations.

BACKGROUND

Intelligent Electronic Devices (IEDs) are microprocessor-based devices used by the electric power industry to control power system switching devices, such as circuit breakers, reclosers, etc. With the standardization by the International Electrotechnical Commission (IEC) of the IEC 61850 process bus, most modern IEDs now support voltage and current inputs in a digital format, as Sampled Value (SV) streams transmitted as Ethernet packets on the process bus. In implementations according to the IEC61850-9-2 specifications, a merging unit (MU) is the device that samples the analog measurements (voltages and currents) of the primary high voltage power circuit, encodes the measurement values into Ethernet packets, and injects them onto the process bus. The IED receives these SV packets from the process bus, processes them, and uses the SV as the inputs to its various fault detection and protection functions.

More particularly, the IED processes the SV values with an internal Discrete Fourier Transform function to convert the SV streams into phasor values. The phasors are time-synchronized within an electrical power substation and can be published on the station bus, through Manufacturing Message Specification (MMS) reporting or according to the IEEE Standard for Synchrophasor Measurements for Power Systems (IEEE C37.1118-2011), for example. Phasor information can also be made available on the station bus through GOOSE (Generic Object Oriented Substation Events) messaging.

The IED thus operates on the basis of measured signals (e.g., voltages and currents, etc.) from attached sensors, signals from other IEDs indicating the state of their controlled elements, and signals from a supervisory system. The IED can also generate signals to act on its switching elements, to communicate its state to other IEDs or to inform the supervisory system. These signals are either hardwired or transmitted as network messages, for instance according to IEC 61850.

One key function of the IED is to detect that a fault happens on the primary circuit and to issue a "trip" command to activate a switching device and thus disconnect the faulty parts of the circuit. During this process, the analog inputs to the MUs and the resulting digitized SV packets are critical to the proper operation decision of the IEDs. Compared to earlier protection systems that relied on hardwired analog inputs, the use of digitized sample value streams and Ethernet technology opens the doors to cyber-attacks on the digitized sample value data. An attacker, once gaining access to the process bus or to a merging unit, can modify the SV packets received by the corresponding IED, and thus can manipulate the protection system and, potentially, cause serious consequences to the power grid. For example, a false trip on normally healthy circuits could cause the system to weaken in such a way that might lead to localized or regional grid collapse.

In addition to its primary protection function, an IED can include a control function for direct operation, whereby the IED executes commands from the operator, in particular to open and close assigned switching elements. An operator can initiate a control command from the Control Center (CC), the Station Human-Machine Interface (HMI), or the Local HMI on the front of the IED front. Alternatively, the command can also be executed by directly manipulating a protection device control data object in the IEC 61850 hierarchy, by gaining access to station bus.

Any of these operating channels, if accessed by an attacker, can potentially be used to issue a malicious control command to directly operate a station circuit breaker. This might lead to undesirable consequences if the control command is compromised during critical system operating conditions. Detection of such a malicious direct control command is difficult.

Accordingly, techniques and devices are needed for securing the IED system against cyber-attacks.

SUMMARY

Embodiments of the presently disclosed techniques and apparatus provide methods and systems for secured control of circuit breakers in a digital substation against undesirable operation, including cyber-attacks. These embodiments prevent or mitigate the consequences of a malicious action using a validation approach that will either block the command or will ensure negligible effect on the system operation.

Example methods described herein are suitable for implementation in a first monitoring device in a power system, such as an IED in a digital substation, but might instead be implemented in a separate device, such as in a server or other computer system in the digital substation. One such example method begins with receiving a command to open or close a circuit breaker. One or more state parameters for the electric power network that comprises the substation are then predicted, in response to receiving the command. These predicted one or more state parameters reflect a predicted operating state for at least part of the network under the assumption that the received command is executed. The method further comprises comparing the predicted one or more state parameters to corresponding operational limits for the electric power network. Execution of the command is then blocked, in response to determining that one or more of the predicted state parameters violate the corresponding operational limits.

Variations of the above-summarized method are described in the detailed description that follows, as are apparatuses configured to carry out any of one or more of these methods.

DETAILED DESCRIPTION

In the claims and discussion that follows, terms such as "first", "second", and the like, are used to differentiate between several similar elements, regions, sections, etc., and are not intended to imply a particular order or priority unless the context clearly indicates otherwise. Furthermore, as used herein, the terms "having", "containing", "including", "comprising" and the like are open-ended terms that indicate the presence of stated elements or features but that do not preclude additional elements or features. The articles "a", "an" and "the" are intended to include the plural as well as the singular, unless the context clearly indicates otherwise. Like terms refer to like elements throughout the description.

As noted above, in modern electrical automation, IEC 61850 is a new standard for implementing protection and control functions in digital substations. The IEC 61850 process and station buses are used for digital communications, and IEC 61850 based protocols are used by automation facilities. Remote access to a substation network from control centers or locations external to the substation is not uncommon for control and maintenance purposes. Dial-up, Virtual Private Network (VPN), and wireless are available mechanisms between remote access points and the substation Local Area Network (LAN). These access points are potential sources of cyber vulnerabilities. An intruder/adversary may be able to access the substation network after the firewall is compromise.

When remote access points have been compromised by an intruder/adversary, a malicious attack can be launched by sniffing, decoding and modifying the packets on the Station Bus or directly accessing the substation human-machine interface (HMI). An attacker can thus potentially manipulate the operation of IEDs to directly control substation circuit breakers. This could eventually manipulate the power grid into an unstable and insecure operation and could cause grid collapse and extensive outages to utility customers.

Figure 1:
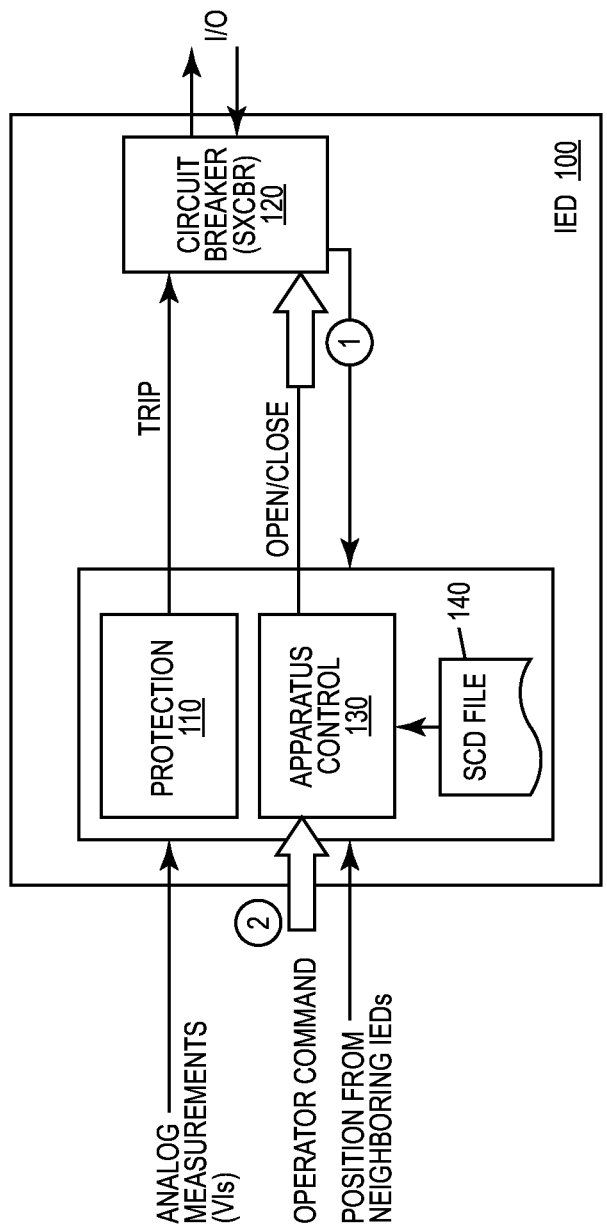
FIG. 1 illustrates an overview of IED control and protection functions.

FIG. 1 provides an overview of control and protection functions in an IED 100. Analog measurements (voltage/current measurements) are processed by a protection function 110, to determine whether a "trip" command should be issued to a circuit breaker (SXCBR) function 120. The IED further includes an apparatus control function 130, which can be used to issue open/close commands to the circuit breaker function 120. The apparatus control function 130 has knowledge of status and interconnection information for neighboring nodes in the substation, which is maintained in a Substation Configuration Description (SCD) file 140.

Possible access points to execute a direct control command with IED 100 are also illustrated in FIG. 1. Direct control of circuit breaker may be carried out:

1. By accessing control attributes of breaker control data object; or
2. Via the Substation Gateway (command from Control Center), Station HMI, or Local IED HMI.

As seen in FIG. 1, the control logic for direct control of a switching element by an IED can be implemented by means of an Apparatus Control (APC) function 130. The APC function 130 is realized by means of a number of logical nodes that are described in IEC 61850-7-4. As an example, typical designated function blocks for a commercial example of an IED are listed below:

Switch controller (SCSWI)
Circuit breaker (SXCBR)
Circuit switch (SXSWI)
Bay control (QCBAY)
Position evaluation (POS_EVAL)
Bay reserve (QCRSV)
Local remote (LOCREM)
Local remote control (LOCREMCTRL)

Figure 2:
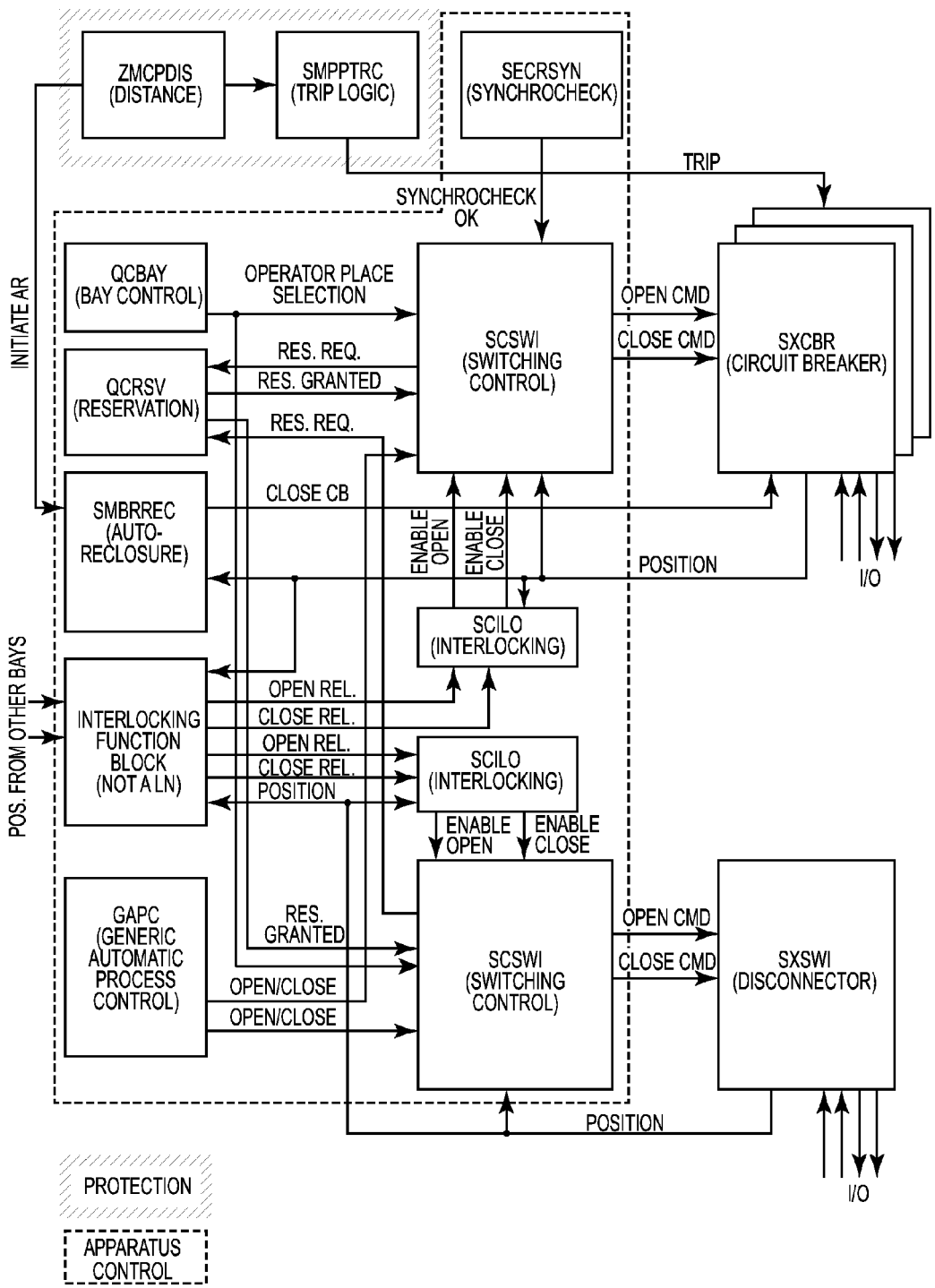
FIG. 2 shows an example of the interaction between APC modules in a typical bay.

In a typical scenario, direct control permission to operate a switching element is given after evaluation of conditions described in the APC modules. These conditions provide for interlocking, operator place selection, and external and internal blockings. An overview of the interaction between these modules is shown in FIG. 2.

The primary mode of evaluation of a direct control operation is for interlocking, which is based on restrictions caused by switching devices other than the one to be controlled. Circuit breaker operations are not always interlocked, however. For instance, closing of a circuit breaker is only interlocked against running disconnectors in the same bay, and a bus-coupler opening is interlocked during a busbar transfer. Thus, whether during normal operation or while operating in an interlock-override mode, an evaluation of circuit breaker opening control command is not necessarily performed in conventional IEDs. Under these conditions, execution of a malicious direct command might result in considerable damage to equipment or otherwise result in undesirable consequences.

Embodiments of the presently disclosed techniques and apparatus address these problems by providing a method and system for secured control of circuit breakers in a digital substation against undesirable operation, including cyber-attacks. These embodiments prevent or mitigate the consequences of a malicious action using a validation approach that will either block the command or will ensure negligible effect on the system operation. The methodology employed is a measurement-based approach, where the dynamic operating state of the electric power network that comprises the substation, as determined from analog measurement inputs (Sample Value streams on the process bus or Voltage and Current phasors transmitted on station bus) and the Single Line Diagram (SLD) for the substation, is used to develop additional security measures. According to some embodiments of these techniques, additional security measures are incorporated on top of basic functions of an Intelligent Electronic Device (IED)—these additional security measures will evaluate a circuit breaker control command for release or blocking status.

According to some embodiments, the evaluation process involves first estimating a succeeding operating state of the electric power network for an intended circuit breaker control command, assuming the command is executed. The estimated state is then compared with preset normal operating limits. If any disparity is detected, the circuit breaker operating command can then be blocked.

In some embodiments, a protection device comprises circuitry and/or a firmware module that takes, as inputs: (i) analog measurements (sampled values streams or voltage and current phasors), (ii) signals indicating a current status of the substation network model, and (iii) a circuit breaker control command. The device or firmware module evaluates the circuit breaker operating command, in view of the measurements and status information, to determine whether to release or block the command, and issues an associated message as output.

Accordingly, detailed herein are methods that include an estimation of the succeeding operating state of the electric power network, under the assumption that a direct circuit breaker control command is executed, using the inputs mentioned above, and an evaluation of the circuit breaker control command, in view of the estimation. The systems disclosed herein can have multiple embodiments depending on the substation configuration (generation, transmission or distribution), the communication network's architecture, and the processing power of IEDs.

As noted above, the methodology employed to evaluate a direct control command is a measurement-based approach, whereby the dynamic operating state of the electric power network is determined from analog measurement inputs (SV streams or voltage and current phasors) and a substation network diagram. In the example embodiments described herein, the substation automation is assumed to be operating based on IEC 61850. However, it will be appreciated that the techniques described herein are more generally applicable.

Figure 3:
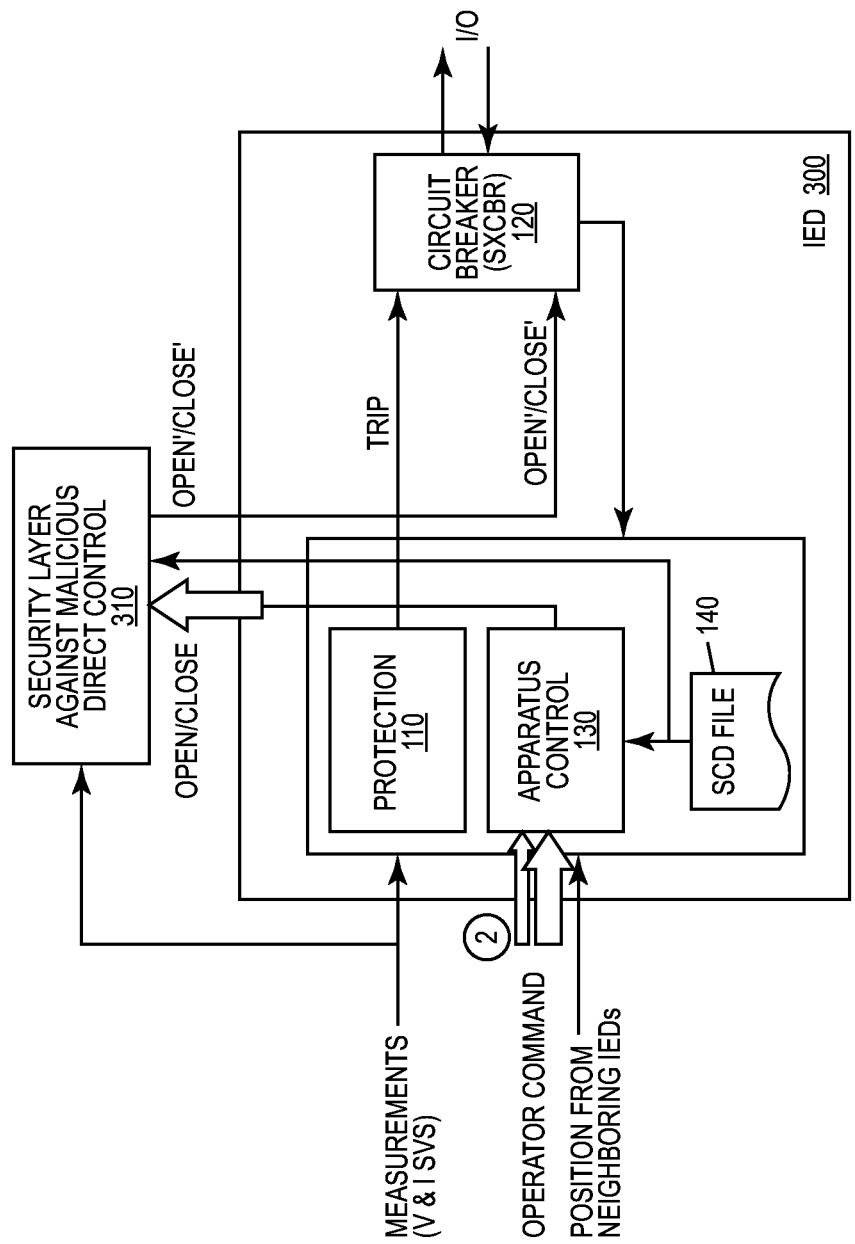
FIG. 3 illustrates features of security enhancement against direct circuit breaker control.

According to various embodiments described herein, security measures are implemented through additional security enhancement layer on a designated Intelligent Electronic Device (IED), or as an additional firmware on secured server. FIG. 3 illustrates an example of an additional security layer 310 added to a modified IED 300. The circuit breaker direct control command is evaluated through this additional security layer for breaker release or blocking status. Thus, open/close commands from apparatus control function 130 are directed to security layer 310 for evaluation, rather than being passed directly to circuit breaker control function 120. The evaluation process involves first estimating, i.e., predicting, the succeeding operating state of the electric power network for an intended circuit breaker control command, and then comparing the estimated state with preset normal operating limits. If any disparity is detected, the circuit breaker operating command will be blocked. If not, the open/close command is passed on to circuit breaker control function 120 for execution.

Security enhancement layer 310 includes circuitry and/or a firmware module that takes as inputs: (i) voltage and current analog measurements; (ii) position signals indicating active circuit topology of the substation single-line diagram (SLD); and (iii) the unevaluated control command for breaker operation. The security enhancement layer predicts the succeeding operating state of critical electric power network components (i.e., transmission line, capacitor bank, transformer and generators, etc.), for example, assuming that the direct circuit breaker control command is executed. Based on this prediction, the security enhancement layer 310 determines circuit breaker release/block status, and issues a corresponding message as output.

Depending on the types of critical substation components evaluated in predicting the operating state of the electric power network, the parameters measured for determining the operating state vary. For example, for a transmission line, the predicted parameter would be line loading levels. For a capacitor bank, the predicted parameters may include an output voltage level; for a generator, the predicted parameters may include a transient stability parameter for the network. For a transformer, the predicted parameters may include a transformer load.

The voltage and current analog measurements used in the prediction could be SV streams, time-synchronized phasors published through MMS reporting or according to the IEEE Standard for Synchrophasor Measurements for Power Systems (IEEE C37.1118-2011, or phasor measurements available through GOOSE. The system can have multiple embodiments depending on the type of analog measurements used and the choice of technologies for implementing the security layer module. For example:

1) The security layer module may be implemented as an integral part of an IED, using SV streams available to the IED. Applications of this embodiment may be limited by the processing power of IED, although processing power in IEDs may be increased to allow for increased functionality.
2) The security layer module may be implemented as an integral part of an IED, using phasor measurements available through GOOSE or published according to the IEEE C37.118 synchrophasor standard. Such an implementation might also use SV streams, in some embodiments.
3) The security layer module may be implemented as an add-on device to the IED using SV streams and/or using phasor measurements available through GOOSE or synchrophasors.
4) The security layer module may be implemented as firmware executing on a station HMI or on a secured server, using time-synchronized phasor measurements available through MMS reporting published as synchrophasors according to IEEE C37.118.

Figure 4:
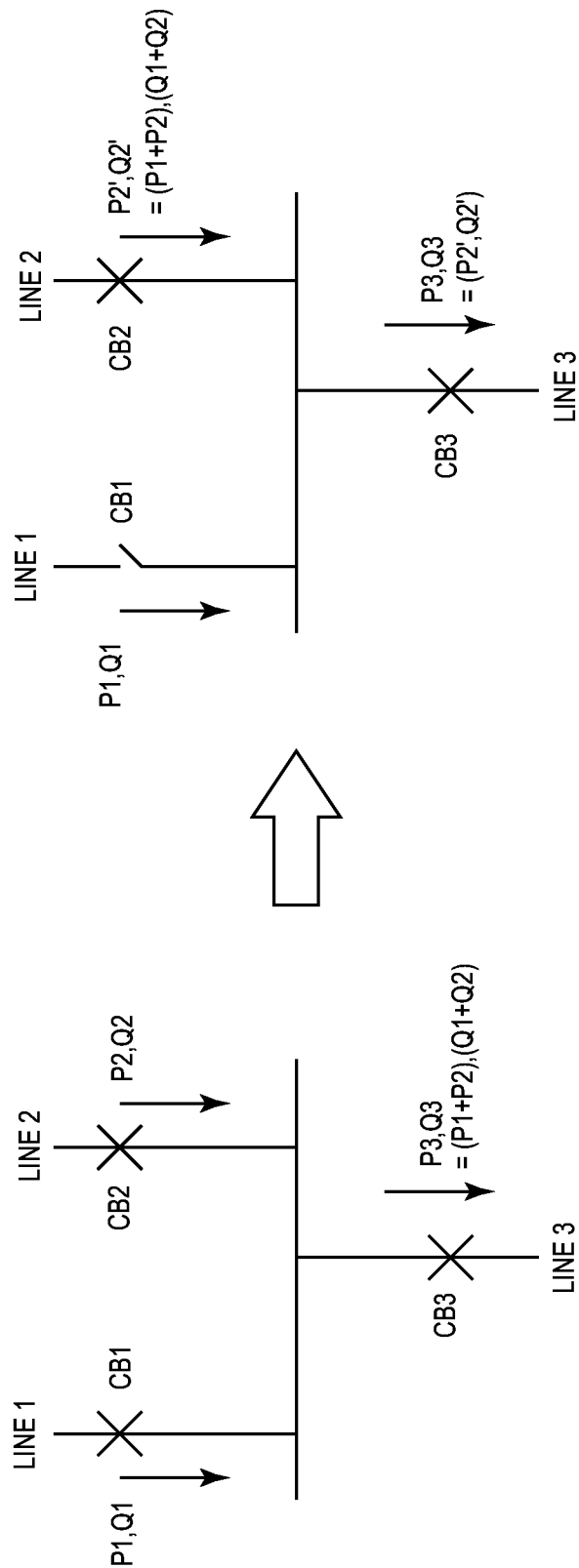
FIG. 4 illustrates a scenario of transmission line overload caused by malicious direct control of circuit breaker.

One example application of such a security layer is for evaluating direct control of circuit breakers in a transmission substation having multiple feeders. In this context, the direct control of circuit breaker during critical operation may result in transmission line overload, due to redistribution of power flows in the lines connected on the same node of the primary circuit. FIG. 4 illustrates an example. As shown in FIG. 4, opening of circuit breaker CB1 results in Line 2 supplying the total load demanded from Line 3. This may force Line 2 to draw more power than its maximum thermal rating, and force tripping in Line 2 due to an overload condition.

To implement the security layer for a circuit breaker opening command in this context, the succeeding operating state of the transmission lines (Lines 1, 2, and 3) is estimated in terms of line loading levels. Then, the opening command is evaluated by comparing the estimated line loading for each transmission line against respective thermal loading limits for the line. If the predicted loading for any of the lines is determined to exceed the corresponding thermal load limit, then the circuit breaker command will be blocked and an alert message issued to the operator.

The design of the security enhancement scheme can be implemented by an additional decision module to Apparatus Protection and Control (APC) functional blocks, as was illustrated in FIGS. 2 and 3. In some embodiments, this module collaborates with multiple subscribed IEDs to obtain current transmission line loading levels (referred to as CLLs) for the primary circuit, predicts the CLLs that will result from executing the circuit breaker command, and identifies any disparities in loading conditions (referred to as Overload Detection, OLD) on respective lines.

Figure 5:
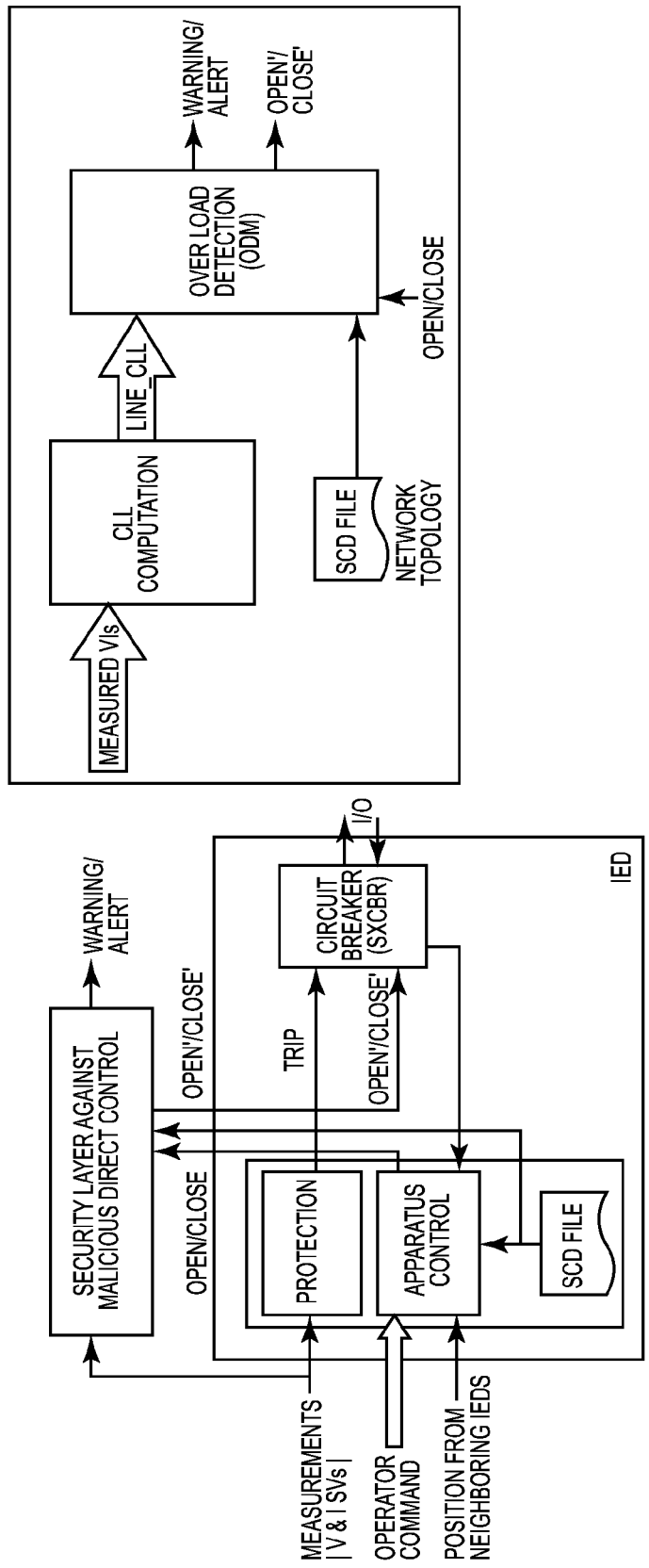
FIG. 5 illustrates details of an example security enhancement layer.
Figure 6:
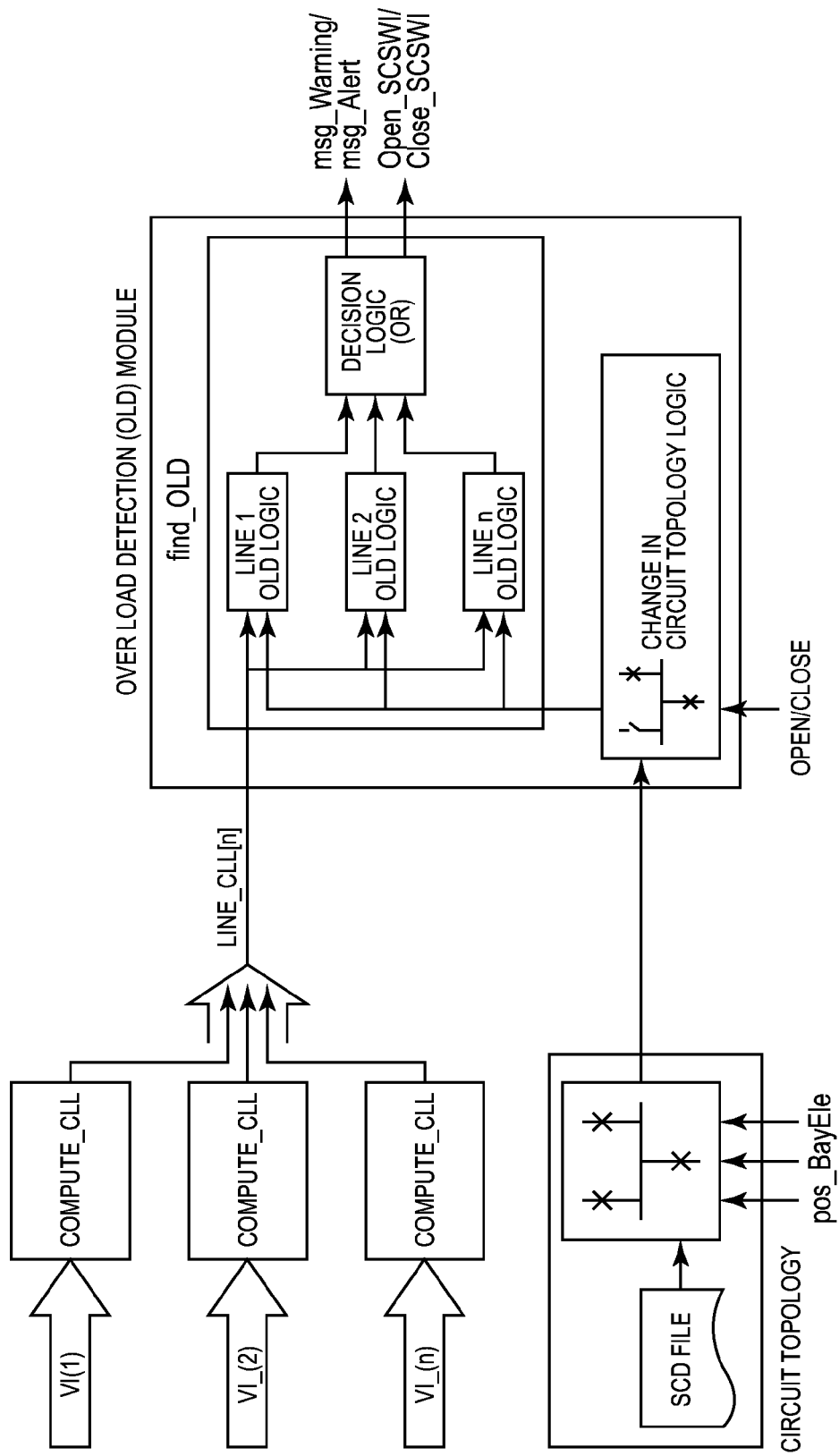
FIG. 6 shows an implementation of an example security layer for direct control of circuit breaker.

Details of an example design for a decision module providing direct control security are shown in the block diagrams of FIGS. 5 and 6. An example implementation scheme consists of the following steps:

1. An issued direct control command (Open/Close) will modify the substation network model through the Change in Circuit Topology Logic 620, as shown in FIG. 6.

To obtain the dynamic substation network model the Change in Circuit Topology Logic 610 will make use of the SCD file 635 and station bay elements status signals received at Circuit Topology Logic 630, from the subscribed IEDs.

2. The Overload detection Module (find_OLD) 610 will execute to assure current line loading limits are met by evaluating the Current Line Loading levels (compute_CLL) against respective lines thermal loading limits.

Current Line Loading Levels are calculated from voltage and current phasors of subscribed IEDs using a compute_CLLmodule.

Results from individual line CLL (compute_CLL) and change in circuit topology are then used to compute the individual line over loading condition by comparing against the thermal load limits of respective lines.

3. The Overload detection Module (find_OLD) 610 is now responsible for Open/Close (Open_SCSWI/Close_SCSWI) of the circuit breaker operation, and generates corresponding messages msg_Warning/msg_Alert to the system operator.

Figure 7:
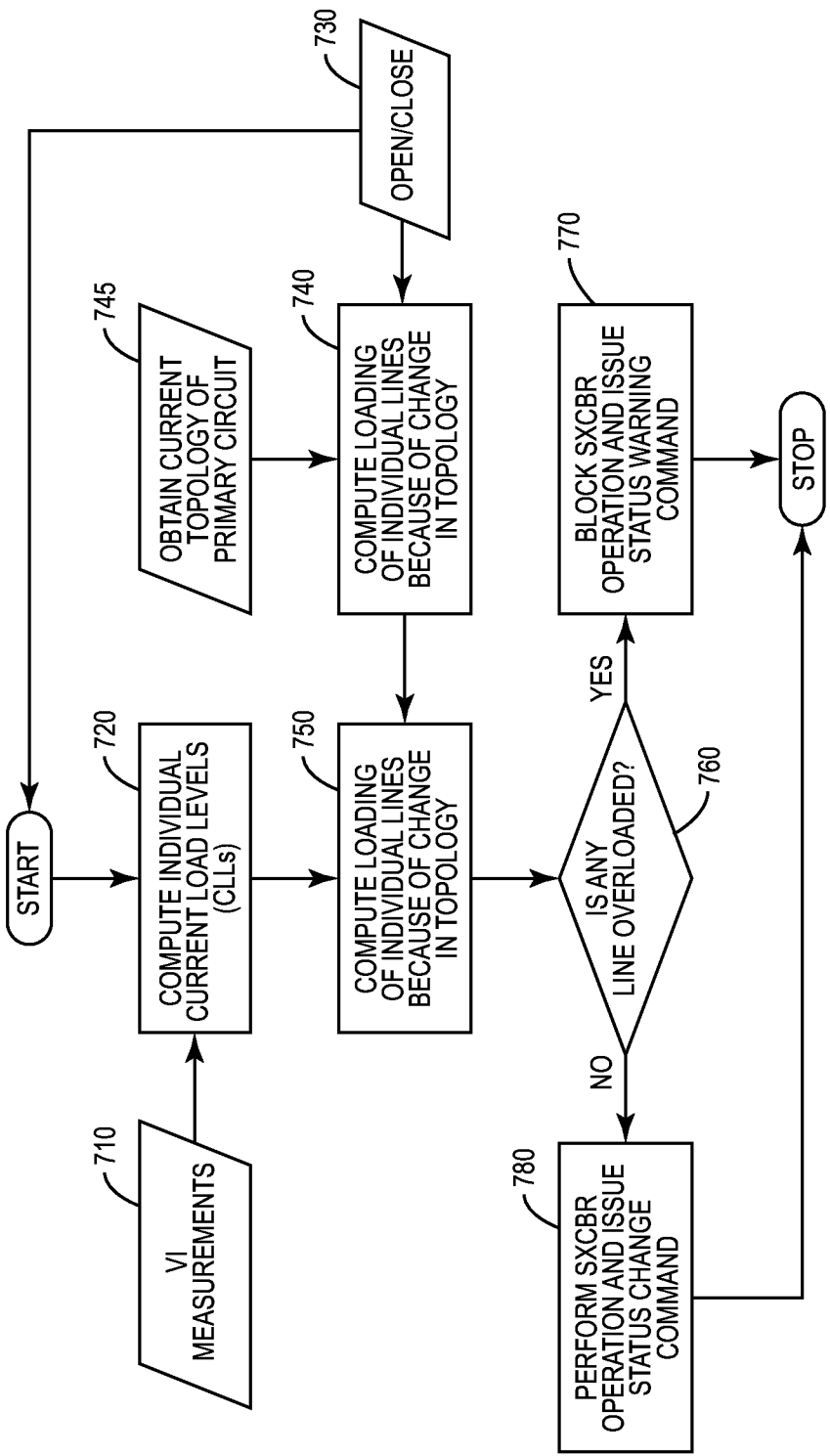
FIG. 7 is a flowchart showing an example process for overload detection scheme for direct control of circuit breaker.

The detailed flow of an example algorithm is shown in FIG. 7. As seen at block 710, voltage/current (VI) measurements are input to the process. Phasor measurements may be used, instead of or in addition to sampled value data, in some embodiments. Using the measurement data, individual current load levels (CLLs) for several transmission lines in the substation are computed, as shown at block 720.

An open or close command, as shown at block 730, triggers the determination of a change in circuit topology resulting from the command, as shown at block 740. This determination, which is a prediction of the topology that would result if the command were executed, is based on the current topology of the primary circuit, as shown at block 745. This topology reflects the status information for breakers in the substation, for example, as received from neighboring IEDs in the substation.

As shown at block 750, a predicted loading of individual lines is computed, based on the change in topology that would result from execution of the open/close command. At block 760, this predicted loading is compared to limits for each of the respective lines. If any of the lines is overloaded, the command is blocked, and an appropriate message is issued, as shown at block 770. Otherwise, the command is executed, as shown at block 780.

Figure 8:
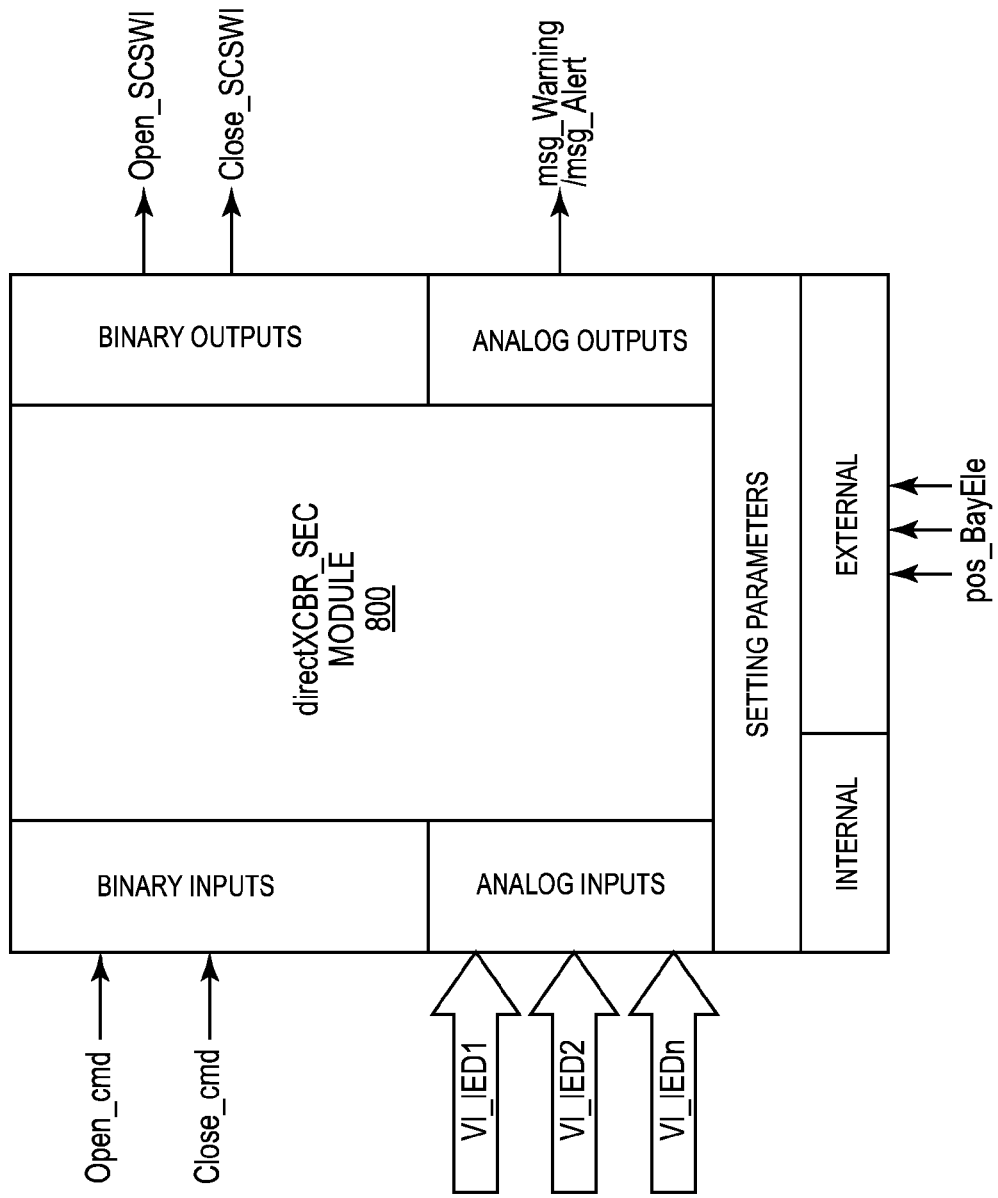
FIG. 8 is a function block for an example enhanced security module.

A function block for a security layer module is shown in FIG. 8, and is here referred to as directXCBR_SEC module 800. The core functions of the security layer module 800 are to validate an issued direct command, in coordination with the neighboring IEDs, and to publish a warning/alert status and block the command if any disparities in the line loading levels are detected. The line loading levels are extracted from the input voltage and current phasors and the disparities are forecasted by determining future changes in substation network diagram obtained from SCD file and status signals from station bay elements. The module includes sub-modules/internal-functions (compute_CLLmodule, find_OLDmodule) to implement complete functionality; inputs, outputs, and functionality of these sub-modules are described in the tables that follow.

TABLE 1

Binary input signals

| Name | Description |
|---|---|
| Open_cmd | Direct control command from the operator to open switching element |
| Close_cmd | Direct control command from the operator to open switching element |

TABLE 2

Analog input signals

| Name | Description |
|---|---|
| VI[i] | Real-time analog values of currents and voltages from merging units/IEDs corresponding to the substation's critical components |

TABLE 3

Binary output signals

| Name | Description |
|---|---|
| Open_SCSWI | Secured processed control command in response to operation Open control command (open_cmd) |
| Close_SCSWI | Secured processed control command in response to operator close control command (close_cmd) |

TABLE 4

Analog output signals

| Name | Description |
|---|---|
| msg_Warning | Encoded message for broadcasting to the control station/station HMI when Open_SCSWI command is issued |
| msg_Alert | Encoded message for broadcasting to the control station/station HMI when Close_SCSWI command is issued |

TABLE 5

External signals

| Name | Description |
|---|---|
| pos_BayEle | Current status of switching components of the substation, showing station topology |

TABLE 6

Setting parameters

| Name | Description |
|---|---|
| term_Line[i] | Line thermal ration - values correspond to the thermal ratings of lines under consideration |
| SCD file | Information regarding the single-line diagram for the section of substation under consideration |

TABLE 7

Internal functions

| Function | Description |
| --- | --- |
| compute_CLL | Computing the real-time loading levels of the lines under consideration |
| find_OLD | Determining the overload condition of the line for a direct control command from the operator to close/open a switching element |

It is important to note that the internal functions of the security layer module 800 detailed above are defined with respect to estimating transmission line operating states only. It will be appreciated that corresponding internal functions to estimate operating states of other critical substation components will vary somewhat depending on the type of component (i.e., transmission line, capacitor bank, transformer and generators, etc.) for which the operating parameters are predicted. To complete the functionality of the security enhancement module, various other internal functions may be incorporated to estimate operating states of other critical electric power network components, such as capacitor banks, transformers, generators, etc. The techniques and apparatus described herein may be extended to incorporate detailed DSP algorithm and advanced coordination schemes with additional functionality to mitigate cyber-attacks involving manipulation of IED controllers, along with the alarm logging and reporting the cyber security events. Also, advanced dynamic line thermal ratings can be implemented in the algorithms to reflect seasonal summer/winter temperature differences.

Figure 9:
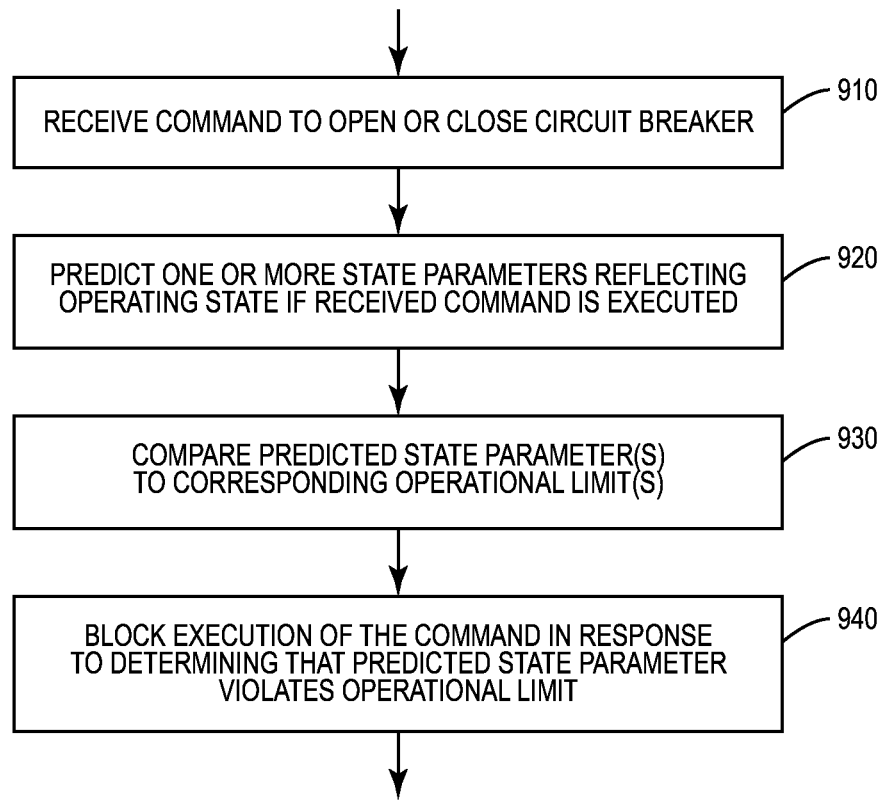
FIG. 9 is a process flow diagram illustrating an example method according to the techniques detailed herein.

It should be appreciated that the preceding detailed examples illustrate techniques for enhancing security in an electric power substation. FIG. 9 is a process flow diagram illustrating a generalized method according to several of the example embodiments discussed above. The illustrated method is suitable for implementation in a first monitoring device in a power system, such as an IED in a digital substation, but might instead be implemented in a separate device, such as in a server or other computer system in the digital substation.

As shown at block 910, the illustrated method begins with receiving a command to open or close a circuit breaker. As shown at block 920, one or more state parameters for the electric power network that comprises the substation are then predicted, in response to receiving the command. The predicted one or more state parameters reflect a predicted operating state for at least part of the network, under the assumption that the received command is executed.

As shown at block 930, the method further comprises comparing the predicted one or more state parameters to corresponding operational limits for the electric power network. Execution of the command is then blocked, as shown at block 940, in response to determining that one or more of the predicted state parameters violate the corresponding operational limits.

In some embodiments, the method further comprises collecting measurement data reflecting voltage, current, or power conditions at one or more monitored points in the electric power substation. The predicting of one or more state parameters is based on this collected measurement data. The collected measurement data may comprise one or more of the following, in various embodiments: sampled current and/or voltage data for one or more monitored points in the electric power substation; and phasor measurements for one or more monitored points in the electric power substation. In some embodiments, collecting measurement data comprises receiving a transmission line loading level for one or more monitored points in the electric power substation; in others a transmission line loading level for one or more monitored points is calculated from collected measurement data. In some embodiments, the collecting of measurement data comprises collecting measurement data for a point in the electric power substation monitored by the device and receiving, from one or more additional devices, measurement data for one or more additional points monitored by the one or more additional devices.

In various embodiments, the predicted one or more state parameters may comprise one or more of the following: a line loading level for a transmission line; an output voltage level for a capacitor bank; a transient stability for a generator; and a load for a transformer. Other operating state parameters may be predicted, instead of or in addition to any of the preceding.

In some embodiments, the method further comprises obtaining circuit topology information for at least a portion of the electric power substation. Predicting the one or more state parameters for the electric power substation is based on the circuit topology information. This circuit topology information may comprise, for example, a single-line drawing (SLD) or similar information indicating the interconnection of various components in the electric power substation, and/or status information for one or more switching elements in the electric power substation. Thus, in some embodiments the method illustrated in FIG. 9 further comprises receiving status information for one or more switching elements in the electric power substation, where predicting the one or more state parameters for the electric power network is based on the received status information.

As noted above, the methods described above may be implemented in a computer system operatively connected to one or more intelligent electronic devices (IEDs) in the electric power substation. In other embodiments, the methods may be implemented in an IED itself, which may be modified, in some instances, with an add-on device/module configured to carry out all or part of the techniques described herein. As noted above, the IED may be compatible with the IEC 61850 standards, in some embodiments, and thus may use the Substation Configuration description Language (SCL) and the corresponding Substation Configuration Description (SCD) files specified by IEC 61850. However, the techniques described above and illustrated in FIG. 9 may be implemented more generally, including in monitoring devices that are not compliant with IEC 61850 standards. Particularly, an IED may send and/or receive phasor data in the synchrophasor IEEE C37.118 format.

Monitoring devices configured to carry out any one or more of the methods illustrated above may be similar to existing IEDs, with appropriate modifications made to the processing circuits and/or interface circuits in or associated with the IED. An example monitoring device 1000 configured to carry out some of the disclosed methods is shown in FIG. 10 and comprises a first interface circuit 1010 configured to receive sampled current and/or voltage data for a first monitored point in the power system, and a processing circuit 1020 configured to detect a fault, using the sampled current and/or voltage data, and to determine whether to trip a power system switching device, in response to said detecting.

The interface circuit 1010 in this example monitoring device comprises hardware and, when necessary, supporting software and/or firmware stored in memory, for receiving digital sampled value data from one or several merging units and/or from a common process bus, depending on the system configuration. Interface circuit 1010 may be configured according to an industry standard, in some embodiments, or may implement a proprietary design, in others. The interface circuit 1030 likewise comprises hardware and, when necessary, supporting software and/or firmware stored in memory, for sending and/or receiving measurement information to and from other monitoring devices or to a control device, and/or to exchange control information with one or more control devices in or associated with the electric power substation. In particular, interface circuit 1030 is configured to receive a command to open or close a circuit breaker controlled by the monitoring device 1000. Interface circuit 1030 may be configured according to an industry standard, such as the IEC 61850 station bus, in some embodiments.

Figure 10:
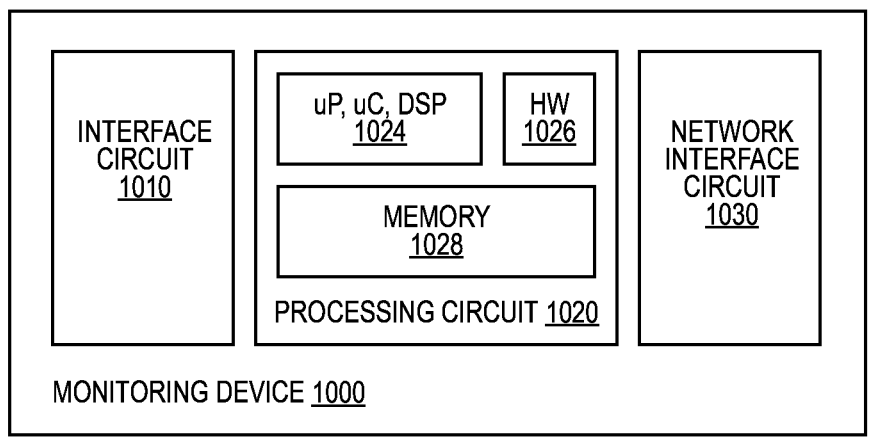
FIG. 10 is a block diagram illustrating components of an example monitoring device according to several embodiments of the apparatuses disclosed herein.

The processing circuit 1020 in FIG. 10 may comprise one or more microprocessors, microcontrollers, digital signal processors, or the like, designated as processor(s) 1024 in FIG. 10, coupled with or including one or more memory devices 1028, where the memory device(s) 1028 store program code for carrying out all or a portion of one or more of the methods detailed above. In some embodiments, the processing circuit 1020 may also comprise additional digital hardware 1026 for carrying out one or more of the operations in the above-described methods.

It will be appreciated that the monitoring device 1000 shown in FIG. 10 may be configured to carry out one or several of the methods described in detail above, as well as variants thereof. Thus, for example, in some embodiments the processing circuit 1020 is configured, e.g., with appropriate program code, to predict one or more state parameters for the electric power network that comprises the substation, in response to receiving a command to open or close a circuit breaker, the predicted one or more state parameters reflecting a predicted operating state assuming the received command is followed, to compare the predicted one or more state parameters to corresponding operational limits for the electric power network, and to block execution of the command in response to determining that one or more of the predicted state parameters violate the corresponding operational limits.

All of the variations of the method illustrated in FIG. 9 are equally applicable to the monitoring device 1000 of FIG. 10. Thus, for example, the processing circuit 1020 in some embodiments is further configured to collect measurement data reflecting voltage, current, or power conditions at one or more monitored points in the electric power substation, and to perform said predicting of one or more state parameters based on the collected measurement data. This measurement data may include, for example, sampled current and/or voltage data for one or more monitored points in the electric power substation, and/or phasor measurements for one or more monitored points in the electric power substation. Likewise, the processing circuit 1020 in some embodiments is configured to predict one or more state parameters comprising one or more of: a loading level; an output voltage level; a transient stability for the substation; and a load for a transformer. Still further, the processing circuit 1020 in some embodiments is further configured to obtain circuit topology information for at least a portion of the electric power substation and to perform said predicting of the one or more state parameters for the electric power substation based on the circuit topology information.

FIG. 10 illustrates an implementation of the presently disclosed techniques in the context of a monitoring/controlling device, such as an IED. As noted above, however, these techniques may be carried out in a computer system operatively connected to one or more intelligent electronic devices in the electric power substation, rather, than in one or more of the IEDs. It will be appreciated, then, that embodiments of the techniques and apparatus disclosed herein include such a computer system, with the computer system comprising interface circuits and processing circuits configured to carry out functions corresponding to those described above for interface circuits 1010 and 130, and processing circuit 1020.

Embodiments of the techniques, apparatuses, and systems described above may be used to address emerging problems in power systems automation and control, and may provide several advantages over existing technology. A core function of the modules described above is to validate an issued direct circuit breaker control command in a digital substation by coordinating with the analog measurements and publishing warning/alert status and block the command if any disparities in the critical components of substation are detected. An application of the techniques is an add-on domain based security layer against undesirable operation (including cyber-attack), which can be incorporated on top of basic functions of designated Intelligent Electronic Device (IED).

The techniques disclosed herein provide a way to make use of a power system's domain-based principles to ensure secure operation of digital substations against malicious direct control of circuit breakers and mitigate major consequences on the power system. An add-on design feature according to some of the embodiments disclosed herein ensures the compatibility of the invented security system to a wide range of substation configurations (i.e., generation, transmission and distribution).

Advantages provided by various embodiments disclosed herein include:

1. Embodiments may be used to provide an additional layer of automatic evaluation for a direct circuit breaker control command.
2. Embodiments not only can ensure secure operation under cyber-attack but can also ensure secure operation against unintentional control command by a real operator.
3. No additional signal routing or communication channel is needed. The techniques and apparatus can be developed according to IEC 61850 or IEEE C37.118 standards. All the signals/data required for implementing the disclosed techniques is directly accessed from IEC 61850 Process Bus or Station Bus, or synchrophasor data stream through the designated IED.
4. In some embodiments, the techniques may not require real-time computation performance, and can be implemented at IED level with minimum integrated hardware upgrade, as the intentional control of circuit breakers is not as time critical an operation as protection.
5. The techniques can be implemented with add-on design (external hardware) to facilitate its usage with equipment from multiple IED vendors.

Detailed examples of several embodiments of the present invention have been described above. Of course, it should be understood that the present invention is not limited to any particular example given in the foregoing description, nor is it limited by the accompanying drawings. Instead, the present invention is limited only by the following claims and their legal equivalents.

What is claimed is:

1. A method, performed in at least one device in an electric power substation, the method comprising:

receiving a command to open or close a circuit breaker from an apparatus control function of an Intelligent Electronic Device (IED) at a security layer module added to modify the IED, wherein the circuit breaker is connected to distribute electric power to at least three transmission lines in an electric power network of the electric power substation;

predicting, at the security layer module, one or more state parameters for each of the transmission lines in the electric power network, in response to receiving the command, the predicted one or more state parameters reflecting a predicted operating state assuming the received command is executed, wherein the one or more state parameters include a line loading level for each of the at least three transmission lines;

comparing, at the security layer module, the predicted one or more state parameters to corresponding operational limits for each of the transmission lines in the electric power network, wherein the corresponding operational limits include a thermal loading limit for each of the at least three transmission lines; and outputting a message from the security layer module to a circuit break control function of the IED to block execution of the command in response to determining that one or more of the predicted state parameters violate the corresponding operational limits.

2. The method of claim 1, further comprising collecting measurement data reflecting voltage, current, or power conditions at one or more monitored points in the electric power substation, wherein said predicting of one or more state parameters is based on the collected measurement data.

3. The method of claim 2, wherein the collected measurement data comprises one or more of:
sampled current and/or voltage data for one or more monitored points in the electric power substation; and
phasor measurements for one or more monitored points in the electric power substation.

4. The method of claim 2, wherein collecting measurement data comprises collecting measurement data for a point in the electric power substation monitored by the device and receiving, from one or more additional devices, measurement data for one or more additional points monitored by the one or more additional devices.

5. The method of claim 1, wherein the predicted one or more state parameters comprise one or more of:
an output voltage level;
a transient stability for the electrical power network; and
a load for a transformer.

6. The method of claim 1, the method further comprising obtaining circuit topology information for at least a portion of the electric power substation, wherein predicting the one or more state parameters for the electric power substation is based on the circuit topology information.

7. The method of claim 1, the method further comprising receiving status information for one or more switching elements in the electric power substation, wherein predicting the one or more state parameters for the electric power substation is based on the received status information.

8. A control device for use in an electric power substation, the control device comprising:
an Intelligent Electronic Device (IED) including a circuit breaker connected to distribute electric power among at least three transmission lines of the electric power substation;
a first interface circuit of the IED operatively connected to the circuit breaker that is configured to receive a command to open or close the circuit breaker; and
a processing circuit added between and operatively connected to the interface circuit and to the circuit breaker to modify the IED to provide a secure layer of control of the circuit breaker, the processing circuit configured to:
predict one or more state parameters for each of the at least three transmission lines of the electric power network, in response to receiving the command, the predicted. one or more state parameters reflecting a predicted operating state assuming the received command is followed, wherein the one or more state parameters include a line loading level each of the at least three transmission lines;
compare the predicted one or more state parameters to corresponding operational limits for each of the transmission lines in the electric power network, wherein the corresponding operational limits include a thermal loading limit for each of the at least three transmission lines; and
output a message to the circuit breaker to block execution of the command in response to determining that one or more of the predicted state parameters violate the corresponding operational limits.

9. The control device of claim 8, wherein the processing circuit is further configured to collect measurement data reflecting voltage, current, or power conditions at one or more monitored points in the electric power substation, and to perform said predicting of one or more state parameters based on the collected measurement data.

10. The control device of claim 9, wherein the collected measurement data comprises one or more of:
sampled current and/or voltage data for one or more monitored points in the electric power substation; and
phasor measurements for one or more monitored points in the electric power substation.

11. The control device of claim 9, further comprising a second interface circuit operatively connected to the processing circuit and configured to collect measurement data for a point in the electric power substation monitored by the device and to receive, from one or more additional devices, measurement data for one or more additional points monitored by the one or more additional devices.

12. The control device of claim 8, wherein the processing circuit is configured to predict one or more state parameters comprising one or more of:
an output voltage level;
a transient stability for the electrical power network; and
a load for a transformer.

13. The control device of claim 8, wherein the processing circuit is further configured to obtain circuit topology information for at least a portion of the electric power substation and to perform said predicting of the one or more state parameters for the electric power substation based on the circuit topology information.

14. The control device of claim 8, wherein the processing circuit is further configured to receive status information for one or more switching elements in the electric power substation and to perform said predicting of the one or more state parameters for the electric power substation based on the received status information.

* * * * *